(12) United States Patent
Abukawa (10) Patent No.: US 6,231,277 B1
(45) Date of Patent: May 15, 2001

(54) CERMET TOOL AND METHOD FOR MANUFACTURING THE SAME

(75) Inventor: Kohei Abukawa, Aichi (JP)

(73) Assignee: NGK Spark Plug Co., Ltd., Nagoya (JP)

( * ) Notice: Subject to any disclaimer, the term of this patent is extended or adjusted under 35 U.S.C. 154(b) by 0 days.

(21) Appl. No.: 09/179,847

(22) Filed: Oct. 28, 1998

(30) Foreign Application Priority Data

Oct. 28, 1997 (JP) .................................................... 9-312696

(51) Int. Cl.$^7$ ...................................................... B23B 27/14
(52) U.S. Cl. ............................ 407/119; 407/118; 75/230; 428/386; 51/309
(58) Field of Search .................................. 407/118, 119; 427/255.2, 255.3, 255.7, 419.7; 75/238, 230; 428/386, 698, 699; 51/309

(56) References Cited

U.S. PATENT DOCUMENTS

| | | | |
|---|---|---|---|
| 3,971,656 | 7/1976 | Rudy | 75/203 |
| 3,994,692 | 11/1976 | Rudy | 29/182.5 |
| 4,049,876 | * 9/1977 | Yamamoto et al. | 428/932 |
| 4,983,212 | * 1/1991 | Iyori et al. | 75/238 |
| 5,186,739 | * 2/1993 | Isobe et al. | 75/238 |
| 5,308,376 | * 5/1994 | Oskarsson | 75/238 |
| 5,710,383 | * 1/1998 | Takaoka | 75/238 |
| 6,024,776 | * 2/2000 | Heinrich et al. | 75/238 |
| 6,057,046 | * 5/2000 | Tsuda et al. | 428/551 |

FOREIGN PATENT DOCUMENTS

| | | |
|---|---|---|
| 7252578 | 3/1995 | (JP) . |
| 7237012 | 12/1995 | (JP) . |
| 8246090 | 9/1996 | (JP) . |

OTHER PUBLICATIONS

Abstract for Publication No. 08/246090, published Sep. 24, 1996 (Japio).
Abstract for Publication No. 08/246090, published Sep. 24, 1996 (Derwent).

* cited by examiner

Primary Examiner—Henry Tsai
(74) Attorney, Agent, or Firm—Dougherty & Troxell (57) ABSTRACT

A cermet tool that has excellent thermal crack resistance, while maintaining plastic deformation resistance, wear resistance and a long service life even when it is used for intermittent cutting is disclosed. The cermet tool comprises Ni or Ni and Co in a total amount of 4–20 wt. %, Ti in an amount of 50–60 wt. %, V, Cr, Zr, Nb, Mo, Hf, Ta, and W in a total amount of 30–40 wt. %, C in an amount of 5–10 wt. %, and N in an amount of 3–8 wt. %. The carbonitride phase contains grains of a Ti carbonitride phase containing Ti in an amount of 90 wt. % or more with respect to all the metal components of the phase. When the cross-sectional microcrystalline structure of the cermet is observed, the ratio of "total area of grains of the Ti carbonitride phase having a ratio of $D_{max}/D_{min}$ of 1.5 or more" to "total area of the hard phase" is 50% or more.

6 Claims, 7 Drawing Sheets

FIRST CORE-SHELL GRAIN { 1 ▨ BONDING PHASE
2 ☐ (I) SHELL PORTION
3 ▨ (I) CORE PORTION
SECOND CORE-SHELL GRAIN { 4 ▨ (II) SHELL PORTION
5 ▨ (II) CORE PORTION

| | | |
|---|---|---|
| FIRST CORE-SHELL GRAIN | 1 ▨ BONDING PHASE | |
| | 2 ☐ (I) SHELL PORTION | |
| | 3 ⋯ (I) CORE PORTION | |
| SECOND CORE-SHELL GRAIN | 4 ▦ (II) SHELL PORTION | |
| | 5 ▧ (II) CORE PORTION | |

CERMET TOOL AND METHOD FOR MANUFACTURING THE SAME

FIELD OF THE INVENTION

The present invention relates to a cermet tool and more particularly to a cermet tool that has excellent thermal crack resistance, while maintaining plastic deformation resistance, wear resistance and a long service life even when it is used for intermittent cutting.

BACKGROUND FOR THE INVENTION

A sintered product referred to herein as a cermet contains, as a hard phase component, a carbide, a nitride, or a carbonitride of Ti which serves as an essential metal component and a Group (4a, 5a, 6a) metal other than Ti, i.e., V, Cr, Zr, Nb, Mo, Hf, Ta, or W. Such materials have become a mainstream material for cutting tools due to their excellent properties, such as excellent plastic deformation resistance, relative to those of conventional super-hard alloys. In recent years, in order to further enhance fracture resistance, thermal shock resistance, and plastic deformation resistance, it has been proposed to incorporate, Ti carbide into the hard phase, of Ti nitride or Ti carbonitride having high toughness and thermal conductivity, (see, for example, Japanese Patent Publication (kokoku) No. 56-51201.

Furthermore, the Japanese Patent Application Laid-Open (kokai) No. 8-24690 discloses a microcrystalline structure which can enhance wear resistance and fracture resistance of the aforementioned Ti nitride-containing cermet. Namely, there is disclosed a core-shell structure in which the central portion (mainly formed of Ti carbonitride) of the core-containing hard phase of the cermet is formed of rounded block-shaped grains primarily formed of (Ti, M)CN and having an aspect ratio of 1.4 or less. There is also disclosed the structure in which the core-containing hard phase is formed such that a Ti carbonitride phase accounts for 90% or less by volume of the core-containing hard phase. This microcrystalline structure improves fracture resistance of aa tool through an increase in strength, while maintaining wear resistance thereof.

For enhancing the strength and hardness of the cermet, tools which are disclosed in the aforementioned publication, it is advantageous to form the central portion of the core-containing hard phase into a rounded-block shape in the microcrystalline structure. However, toughness in turn decreases, with the result that the thermal crack resistance of the substrate decreases. Thus, the problem of poor service life arises in applications that require high thermal crack resistance, such as intermittent cutting of steel.

Accordingly, an object of the present invention is to provide a cermet tool having excellent thermal crack resistance and a long service life even when the tool is used for intermittent cutting such as intermittent cutting of steel, while maintaining plastic deformation resistance and wear resistance that are advantageous points of cermets and to provide a method for manufacturing the same.

BRIEF SUMMARY OF THE INVENTION

In essence, the present invention contemplates an improved cermet tool wherein the essential portion of the tool is formed of a cermet having a structure which includes a bonding phase and a hard phase. The bonding phase is predominantly formed of Ni or Ni and Co, and the hard phase is predominantly formed of a carbonitride phase containing Ti, which serves as an essential metal component. The hard phase also includes at least one metal (M) which is selected from the group consisting of V, Cr, Zr, Nb, Mo, Hf, Ta, and W and mixtures thereof. In a preferred embodiment of the invention, the cermet comprises Ni or Ni and Co in a total amount of 4–20 wt. %, Ti in an amount of 50–60 wt. %, at least one metal selected from the group of V, Cr, Zr, Nb, Mo, Hf, Ta, and W in a total amount of 30-40 Wt. %, C (carbon) in an amount of 5–10 wt. %, and N (nitrogen) in an amount of 3–8 wt. %;

the carbonitride phase contains grains of the Ti carbonitride phase containing a metal component Ti in an amount of 90 wt. % or more with respect to all the metal components of the phase; and a cross-sectional microcrystalline structure of the cermet shows that the "total area of grains of the Ti carbonitride phase having a ration of $D_{max}/D_{min}$ of 1.5 or more" to the "total area of the hard phase" to be 50% or more. $D_{max}$ and $D_{min}$ are respectively defined as a maximum diameter and a minimum diameter of grains of the titanium carbonitride phase in the microcrystalline structure.

In the preferred embodiment of the invention the carbonitride phase is predominantly formed of first core-shell grains having a core portion (I) comprising a Ti carbonitride phase which contains Ti in an amount of 90 wt. % or more of the metal components in the phase. It also includes a shell portion (I) which is formed around the core portion (I) and comprises a first (Ti, M) carbonitride phase containing Ti in an amount of 40–60 wt. % of the metal components in the phase and one or more metals selected from V, Cr, Zr, Nb, Mo, Hf, Ta, and W in an amount of 40–60 wt. % of the metal components in the phase. The carbonitride phase also includes second core-shell grains having a core portion (II) comprising an M (metal) carbonitride phase whose metal component includes one or more metals selected from V, Cr, Zr, Nb, Mo, Hf, Ta, and W in an amount of 90 wt. % or more and a shell portion (II) which is formed around the core portion (II). The shell portion II comprises a second (Ti, M) carbonitride phase containing Ti in an amount of 20–30 wt. % of the metal components in the phase and one or more metals selected from V, Cr, Zr, Nb, Mo, Hf, Ta, and W in an amount of 70–80 wt. % of the metal components in the phase. A cross-sectional microcrystalline structure of the cermet shows the ratio of "total area of the core portion (I) having a ratio of $D_{max}/D_{min}$ of 1.5 or more" to "total area of the first core-shell grains and the second core-shell grains" to be 50% or more.

The invention also contemplates a method for manufacturing a cermet tool. The method includes the step of blending a metal powder predominantly formed of Ni or Ni and Co in an amount of 4–20 parts by weight, a powder of a carbonitride whose metal component includes at least one metal selected from V, Cr, Zr, Nb, Mo, Hf, Ta, and W in an amount of 25–40 parts by weight, and a material selected from the group consisting of Ti carbonitride, Ti nitride and/or Ti carbide or a combination of Ti nitride and Ti carbide in a total amount of 60–75 parts by weight to obtain a mixture of powders forming the mixture of powders. The powders are then formed into a predetermined shape and the resultant compact is fired at 1400–1650° C. During the firing, the temperature is increased or elevated from a first temperature of between 1300–1400° C. i.e., a temperature which is lower than the firing temperature, to the firing temperature at 5–10° C./minute.

In a preferred method for manufacturing a cermet tool according to the invention, the temperature is elevated from a second temperature, which is set at 800° C. or more, to the first temperature of between about 1300–1400° C. at 1–5° C./minute.

DETAILED DESCRIPTION OF THE PREFERRED EMBODIMENTS OF THE INVENTION

It has now been found that a tool having excellent thermal crack resistance and wear resistance can be obtained by controlling the microcrystalline structure of the cermet which constitutes the essential portion of the tool. The cermet which is formed is mainly composed of a bonding phase predominantly formed of Ni or Ni and Co, and a hard phase predominantly formed of Ni or Ni and Co, and a hard phase predominantly formed of a carbonitride phase containing essential Ti and at least one metal selected from the group consisting of V, Cr, zr, Nb, Mo, Hf, Ta, and W (metals other than Ti may generally be referred to as "M"). The present invention is based on this finding. That is, in the cross-sectional microcrystalline structure of the cermet, the ratio of "total area of Ti carbonitride grains in the hard phase having a ratio of $D_{max}/D_{min}$ (also called aspect ratio) of 1.5 or more" to "total area of the hard phase" is controlled to become 50% or more, wherein $D_{max}$ and $D_{min}$ are respectively defined as a maximum diameter and a minimum diameter of each grain of the titanium carbonitride phase.

Figure 1:
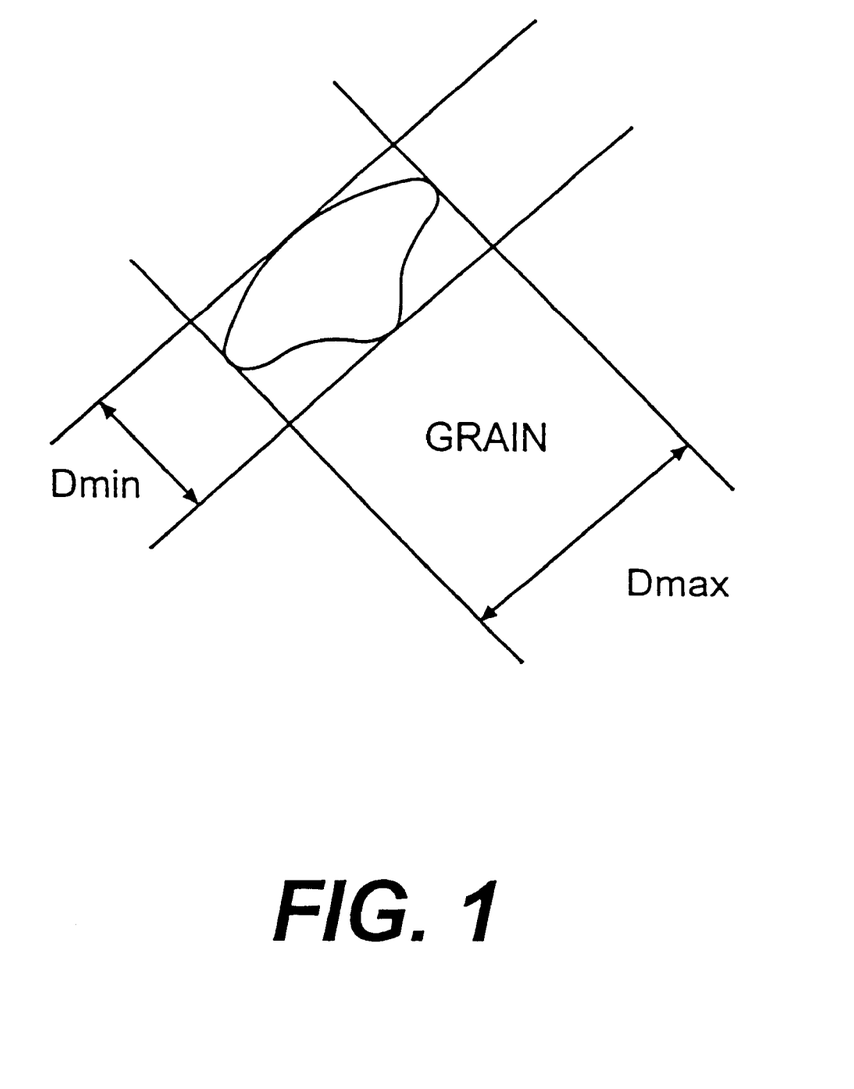
FIG. 1 is a schematic illustration which shows a maximum grain size and a minimum grain size as used for obtaining an aspect ratio.

As shown in FIG. 1, the maximum diameter $D_{max}$ of a grain of the Ti carbonitride phase represents a maximum value of the distance between two parallel lines which are tangent to the contour line of the grain and do not traverse the grain area in the cross-sectional (view) and the minimum diameter $D_{min}$ similarly represents the minimum value of the distance.

The service life of a tool during, for example, intermittent cutting of steel tends to be affected by fracture of a tool tip caused by evolution of thermal cracking. Therefore, the thermal crack resistance of the cermet must be enhanced in order to improve service life of the tool during intermittent cutting. Now, when high-aspect-ratio grains of the Ti carbonitride phase having a $D_{max}/D_{min}$ value of 1.5 or more are homogeneously dispersed into the microcrystalline structure as in the present invention, evolution of thermal cracks is prevented by the high-aspect-ratio grains. Thus, there are obtained tools having a long service life and excellent reliability and suitable for an intermittent cutting process such as intermittent cutting of steel.

The reasons why the aspect ratio of the grains of Ti carbonitride phase and the content ratio thereof are determined in accordance with the above-described manner are as follows. When samples whose Ti-carbonitride-phase grains have a variety of aspect ratios but a constant content ratio, it was found that fracture of a tool tip caused by evolution of thermal cracks frequently occurred during cutting if the aspect ratio was less than 1.5. Therefore, the aspect ratio was determined to be 1.5 or more. On the other hand, when samples whose Ti-carbonitride-phase grains have a constant aspect ratio but a variety of content ratios were compared, it was found that the thermal crack resistance was not improved commensurate which an increase of the aspect ratios if the total area of grains of the Ti carbonitride phase to the total area of the hard phase was 50% or less. Therefore, the content ratio was determined to be 50% or more.

Also, when the total content of Ni and Co in the cermet is less than 4 wt. %, formation of the bonding phase in the microcrystalline structure becomes poor, resulting in insufficient fracture resistance of the cermet. Furthermore, when the total amount of Ni and Co is in excess of 20 wt. %, formation of the hard phase becomes poor, resulting in insufficient wear resistance of the cermet. Accordingly, the total content of Ni and Co in the cermet is preferably between 4–20 wt. %, more preferably between about 8–13 wt. %.

When the content of Ti is 50 wt. % or less or the total content of M is in excess of 40 wt. %, formation of grains of the Ti carbonitride phase becomes poor, resulting in a decrease in thermal crack resistance and wear resistance of the cermet. However, when the content of Ti is in excess of 60 wt. % or the total content of M is less than 30 wt. %, the amount of the below-mentioned (Ti, M) carbonitride phase (I) formed around the high-aspect-ratio grains of the Ti carbonitride phase decreases, with the result that the toughness of the cermet may decrease. Accordingly, the content of Ti is between about 50 and about 60 wt. % and the total content of M is 30–40 wt. %, more preferably about 54 to about 57 Ti wt. % and 32–34 wt. % M.

Furthermore, in order to incorporate the above Ti component and M component as constitutional elements in the carbonitride phase, the carbon content (C) must be 5–10 wt. %, preferably 8–9 wt. %. The content of N (nitrogen) must be 3–8 wt. %, preferably 5–6 wt. % for the same reason.

The characteristics of the microcrystalline structure of the cermet used in the tool of the present invention may also be described in terms of a three-dimensional structure such that the ratio of "total volume of grains of the Ti carbonitride phase having a ratio of $d_{max}/d_{min}$ (a maximum diameter/a minimum diameter) of 1.5 or more" to "total volume of the hard phase" is 50% or more. In this case, $d_{max}$ and $d_{min}$ may be defined as the maximum value and the minimum value respectively of the distance between two parallel planes which are tangent to the grain and do not traverse the grain.

For example, when one grain is considered, the aspect ratio of the grain represented by the ratio of $D_{max}$ to $D_{min}$, $D_{max}/D_{min}$, in an arbitrary cross-section is not always equal to the grain aspect ratio $d_{max}/d_{min}$ determined three-dimensionally as described above. However, statistically speaking, a state that the ratio of "total area of grains having a ratio of $D_{max}/D_{min}$ of 1.5 or more" to "total area of the hard phase" is 50% or more may approximately be equivalent to a state that the ratio of "total volume of grains having a ratio of $d_{max}/d_{min}$ of 1.5 or more" to "total volume of the hard phase" is 50% or more, on condition that a number of grains of Ti carbonitride are not oriented to a specific direction and are homogeneously distributed.

The cermet tool of the present invention may also be described in another way; i.e., in terms of characteristics of the microcrystalline structure. That is, in the cermet of the tool, the bonding phase accounts for 4–20 wt. % of the total weight, and the hard phase is predominantly formed of the following two types of core-shell grains.

The first type of core-shell grains: have a core portion (I) comprising a Ti carbonitride phase containing Ti in an amount of 90 wt. % or more of the metal components in the phase and a shell portion (I) which is formed around the core portion (I) and comprises a first (Ti, M) carbonitride phase containing Ti in an amount of 40–60 wt. % of the metal components in the phase and one or more elements of M in a total amount of 40–60 wt. % of the metal components in the phase.

The second type of core-shell grains: include a core portion (II) comprising an M carbonitride phase containing one or more elements of M in a total amount of 90 wt. % or more and a shell portion (II) which is formed around the core portion (II) and comprises a second (Ti, M) carbonitride phase containing Ti in an amount of 20–30 wt. % of the metal components in the phase and one or more elements of M in a total amount of 70–80 wt. % of the metal components in the phase.

Moreover, a cross-sectional microcrystalline structure of the cermet shows the ratio of "total area of the core portion (I) having a ratio of $D_{max}/D_{min}$ of 1.5 or more" to "total area of the first core-shell grains and the second core-shell grains" to be 50% or more.

By virtue of the above-described core-shell structure, the core portion (I) formed of the Ti carbonitride phase having a high-aspect ratio is covered with the shell portion (I) comprising the first (Ti, M) carbonitride phase, so that the overall aspect ratio of the grains becomes approximately 1. Therefore, the high aspect ratio Ti carbonitride phase improves thermal crack resistance. In addition, since the overall aspect ratio of the core-shell grains is not so high, a portion where stress is easily concentrated such as an acute-angled portion is hardly formed. Thus, a cermet tool having excellent strength and toughness is realized.

When the cermet contains the bonding phase in an amount of less than 4 wt. %, the cermet has poor fracture resistance, whereas when the content of the bonding phase is in excess of 20 wt. %, the cermet contains the hard phase in an insufficient amount, resulting in poor wear resistance. Accordingly, the bonding phase is contained in an amount of 4–20 wt. %, preferably about 8–13 wt. %.

The bonding phase excepting portions occupied by inevitable impurities can be formed of Ni. For example, Ni may partially be substituted with Co. The substitution has the effect of enhancing densification during sintering. In this case, Ni is substituted with Co preferably in an amount of 50–70 wt. %. When the amount of the substitution of Ni with Co is less than 50%, the above effect provided by substitution with Co is not remarkable, whereas when the substitution amount is in excess of 70%, corrosion resistance of the cermet may decrease and the cost increases wastefully due to the increase of the content of the relatively expensive Co.

Now, in order to improve the thermal crack resistance of the cermet, the carbonitride phase in the cermet microcrystalline structure has conventionally been formed of coarse grains. In this case, the fracture toughness is enhanced, so that the thermal crack resistance is improved as a secondary effect. However, when the carbonitride phase is formed of coarse grains, surface roughness of a machined surface of a workpiece increases, and wearing of the tip of a cutting tool progresses resulting in a shortened service life. In contrast, the thermal crack resistance of the cermet tool of the present invention is enhanced by increasing the aspect ratio of grains of the Ti carbonitride phase. Therefore, the tool overcomes to a degree the above-described problem, when the grains of the Ti carbonitride phase are A micrograms. Paradoxically, when the Ti carbonitride phase are formed of micrograms, specifically, micrograms having an average grain size of 2 $\mu$m or less (preferably 1 $\mu$m or less), the wear resistance of the tip of the tool and the service life of the tool can be increased. The average grain size of the overall hard phase is preferably 1.5 $\mu$m or less (more preferably 0.5 $\mu$m or less) in view of enhancing the wear resistance of the tip of the tool.

The cermet tool of the present invention may serve as a cutting tool where an edge portion serving as a cutting edge is formed in the edge portion, and in this case, the angle formed between the chamfer and the face may be adjusted within the range of 20–35°. When the angle is less than 20°, chipping of the cutting edge easily occurs at the flank side, whereas when it is in excess of 35°, the chipping easily occurs at the face side.

In order to obtain the above-described cermet tool, the following method is effectively employed. The method involves the following steps: mixing a metal powder predominantly formed of Ni or Ni and Co in an amount of 5–20 parts by weight, a carbonitride powder containing one or more elements of M as the metal component(s) (hereinafter referred to as M carbonitride powder), in an amount of 25–40 parts by weight. A powder containing essential Ti carbonitride and optional Ti nitride and/or Ti carbide or a powder containing Ti nitride and Ti carbide (hereinafter referred to as Ti carbonitride-forming powder) in a total amount of 60–75 parts by weight are added to provide a mixture of powders or powder mix. This mixture of powder is then formed into a predetermined shape; and the shaped compact is fired at a firing temperature of 1400–1650° C. The firing temperature is elevated at 5–10° C./minute from a first temperature of about 1300 1400° C. i.e., at temperature lower than the firing temperature, to the firing temperature of 1400–1650° C.

The temperature range within which the first temperature is predetermined nearly corresponds to the liquid phase-developing temperature when the bonding phase comprises predominantly Ni or Ni and Co. When the M carbonitride powder and the Ti carbonitride powder are used as raw powders of the hard phase and the temperature elevation from the above temperature range to the firing temperature is performed at the above-mentioned temperature-elevating rate, grains of the Ti carbonitride phase are formed such that the ratio of "total area of the grains in the phase having an aspect of 1.5 or more" to "total area of the hard phase" becomes 50% or more.

It is presently believed that the reason why the ratio of "total area of the grains in the phase having an aspect ratio of 1.5 or more" to "total area of the hard phase" becomes 50% or more is that the employment of the above-described temperature-elevating rate prevents dissolution of Ti carbonitride into a liquid phase during sintering, with the result that a large number of grains of the Ti carbonitride phase having high aspect ratios remain in the microcrystalline structure. The width of the temperature range (range from a first temperature to a firing temperature) in which the temperature-elevation is performed at a rate of 5–10° C./minute is preferably set within 50–350° C. When the width of the temperature range is less than 50° C., the number of grains of the Ti carbonitride phase having high aspect ratio remaining in the microcrystalline structure are sometimes insufficient. Meanwhile, in order to set the firing temperature within 1400–1650° C. and the first temperature within 1300–1400° C., the width of the above-described temperature range must be 350° C. or less.

The Ti carbonitride-forming powder may be formed of a Ti carbonitride powder singly or in combination with any of a Ti nitride powder of a Ti carbide powder in an appropriate amount. Alternatively, the Ti carbonitride-forming powder may be formed of a mixture of a Ti nitride powder and a Ti carbide powder. As to the M carbonitride powder where M comprises one or more of the aforementioned plurality of metals, a solid solution powder in which these metal components mutually form a solid solution beforehand is preferably used in view of increasing the aspect ratio of the finally obtained Ti carbonitride phase.

Figure 2A:
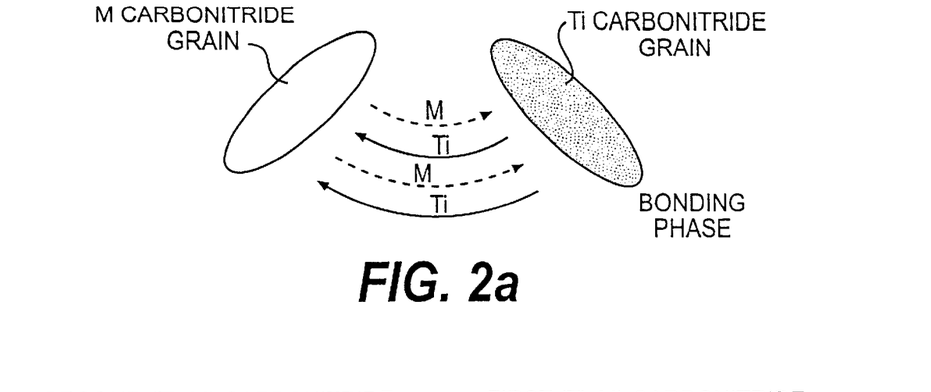
FIG. 2a is a schematic view which illustrates an assumed process of a microcrystalline structure formation wherein raw powders are mixed and heated.
Figure 2B:
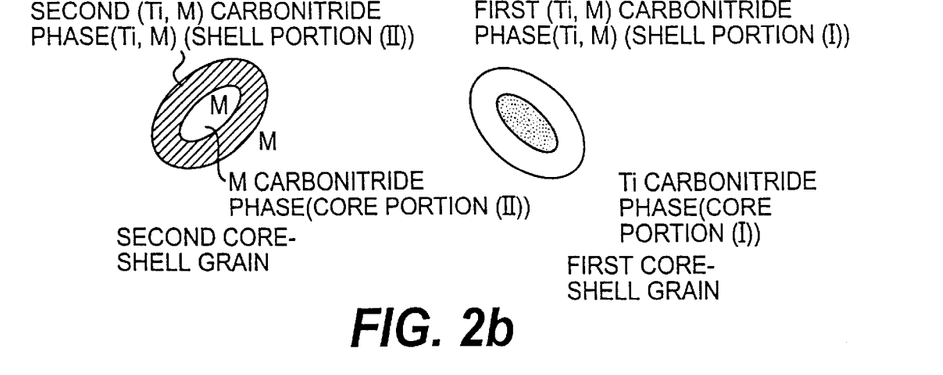
FIG. 2b is a schematic view which illustrates an assumed process of microcrystalline structure formation wherein a partial component of dissolved M carbonitride grain is deposited on the surface of each Ti carbonitride grain to form a shell portion.

FIG. 2 is a schematic view of an assumed process of micrcrystalline structure formation when a Ti carbonitride powder is used as a Ti carbonitride-forming powder. That is, as shown in FIG. 2(a), when the above raw powders are mixed and heated, the metal powder is dissolved at a liquid phase-developing temperature to form a liquid phase, and M carbonitride grains and Ti carbonitride grains are dissolved and diffused in the liquidphase. Then, as shown in FIG. 2(b), a partial component of the dissolved M carbonitride grains is deposited on the surface of each Ti carbonitride grain to enclose the Ti component therein and to form a shell portion (I) formed of a first (Ti, M) carbonitride phase. Simultaneously, the remaining Ti carbonitride phase forms a core portion (I). Thus, first core-shell grains are formed. In some cases, the metal component of the Ti carbonitride phase may contain a diffused M component. Even in such a case, Ti accounts for 90 wt. % or more of the metal component. On the other hand, a partial component of the dissolved Ti carbonitride grains is deposited on the surface of each M carbonitride grain to enclose the M component therein and to form a shell portion (II) formed of a second (Ti, M) carbonitride phase. Simultaneously, the remaining M carbonitride phase forms a core portion (II) to provide second core-shell grains. In some cases, the metal component of the M carbonitride phase may contain a diffused component of Ti. Even in such a case, M accounts for 90 wt. % or more of the metal component. Since the concentration of Ti is lower in the shell of the M carbonitride grains than in the shell of the Ti carbonitride grains, the concentration of Ti in the formed second (Ti, M) carbonitride phase is generally lower than that in the first (Ti, M) carbonitride phase.

Figure 2C:
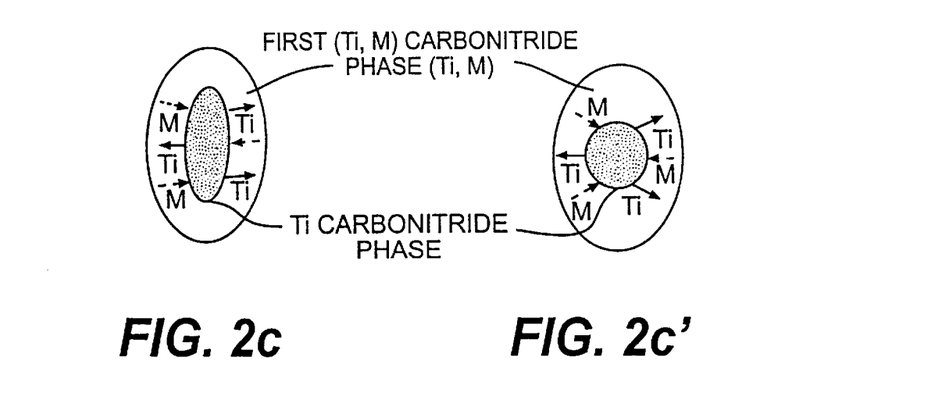
FIG. 2c is a schematic view which illustrates an assumed process of a microcrystalline structure formation wherein excessive dissolution of Ti carbonitride grain is prevented; and, FIG. 2c' is a schematic view which illustrates an assumed process of a microcrystalline structure formation which when combined with FIG. 2c illustrates the prevention of excessive dissolution of Ti carbonitride grains.

As shown in FIG. 2(c), by setting the rate of the temperature increase from the liquid phase-developing temperature to the firing temperature at 5–10° C./minute, excessive dissolution of Ti carbonitride grains is prevented. Therefore, the aspect ratio of the Ti carbonitride phase grain which remains as a core portion is increased. When the above temperature-elevating rate is set to be less than 5° C./minute, the Ti carbonitride phase grains are gradually formed, so that the aspect ratio approaches 1. The result is that the thermal crack resistance of an obtained cermet tool becomes poor. This may be attributed to excessive dissolution of the Ti carbonitride phase, as shown in FIG. 2(d). When the temperature-elevating rate is set to be more than 10° C./minute, the obtained cermet tends to have residual closed holes, resulting in decreased strength. Therefore, the temperature-elevating rate is preferably adjusted within the range of 6–8° C./minute.

Now, in order to realize the ratio of "total area of the grains in the hard phase having an aspect ratio of 1.5 or more" to "total area of the hard phase" of 50% or more, it is preferable to use a Ti carbonitride powder having a grain aspect ratio of 1.5 or more (preferably 2 or more). Then, in order to enhance the tip wear resistance of a tool by setting the average grain sizes of Ti carbonitride grains or the overall hard phase to the above-described values or less, a Ti carbonitride powder and an M carbonitride powder both having an average grain size of 2 $\mu$m or less are preferably used.

Furthermore, the compact is preferably fired in a gas atmosphere under reduced pressure in order to prevent the bonding phase from oxidizing. Employing a nitrogen gas atmosphere under reduced pressure provides a number of advantages. For example, dissolution of Ti carbonitride grains in a liquid phase is prevented by using a nitrogen atmosphere, and, thus, grains of Ti carbonitride having a high aspect ratio are easily formed. This may be attributed to a decrease in wettability of the bonding phase to Ti carbonitride grains in a nitrogen atmosphere. Treatment in a nitrogen atmosphere is also preferred in order to prevent decomposition of the carbonitrides caused by dispersion of a nitrogen component. When a nitrogen gas atmosphere under reduced pressure is employed, as partial pressure of nitrogen is preferably set to 8–12 Torr. When the partial pressure is less than 8 Torr, it does not prevent dissolution of Ti carbonitride grains in a liquid phase or prevent decomposition of carbonitrides. On the other hand, when the partial pressure is 12 Torr or more, a free carbon phase is disadvantageously formed in a sintered compact, resulting in difficulty in obtaining a normal microcrystalline structure.

The temperature is preferably elevated from a second temperature (preset to 800° C. or more) to the first temperature 13000 to 1400° C. at a temperature-elevating rate of 1.5° C./minute during elevation of the temperature to the firing temperature. Adjusting the temperature-elevating rate at less than 1° C./minute results in an extremely long time to attain the first temperature, which decreases efficiency in manufacturing cermet tools. When it is in excess of 5° C./minute, there may arise problems. For example, sintering proceeds at different speeds at an inside portion and a portion near the surface of the sintered compact and carbonitrides are partially decomposed due to dispersion of the nitrogen component.

The cermet tool of the present invention will next be described in detail by way of example.

The following powders were used as raw materials: a Ti carbonitride powder (average grain size: 1.5 μm, Ti carbide/Ti nitride=70/30), a Ti carbide powder (average grain size: 1.0 μm)), a Ti nitride powder (average grain size: 1.4 μm), an Nb carbide powder (average grain size: 1.4 μm), a Ta carbide powder (average grain size: 1.6 μm), a Mo carbide ($Mo_2C$) powder (average grain size: 3.3 μm), a W carbide powder (average grain size: 1.6μm), aNi powder (average grain size: 3.0μm), and a Co powder (average grain size: 1.5μm). Powders of Nb carbide (NbC), Ta carbide (TaC), Mo carbide ($Mo_2C$), and W carbide (WC) were blended at two ratios (A, B) specified in Table 1. Each of the mixtures was dry-mixed by use of a ball mill and compacted at 1 ton/cm² to form a powder compact. The resultant compacts were heat-treated at 1700° C. for 15 hours in a nitrogen atmosphere having a partial pressure of nitrogen of about 500 Torr. This induces carbonitridation of the raw materials and formation of a solid solution thereof. The calcined compacts were re-crushed to thereby obtain M carbonitride (M=Nb, Ta, Mo, orW) powders having compositions (A and B) specified in Table 1.

TABLE 1

| TYPE | COMPONENT | | | |
|---|---|---|---|---|
| | NbC | TaC | $Mo_2C$ | WC |
| A | 0 | 9 | 9 | 17 |
| B | 5 | 0 | 9 | 18 |

As shown in Table 2, each powder of a Ti carbonitride-forming component i.e., Ti carbonitride (TiCN), Ti carbide (TiC), Ti nitride (TiN), the above-described M carbonitride, Ni, and Co were blended at the ratios specified in Table 2. Each of the mixtures was mixed for 72 hours with acetone as a solvent and by use of a ball mill. The resultant powder was dried and kneaded with a microwax-type binder. The kneaded product was then press-formed at 1.5 ton/cm² into a predetermined tool shape and dewaxed (Example: Sample Nos. 1–4).

These compacts were placed in a furnace for firing, and heated from room temperature to 800° C. at an average temperature gradient of 1–3° C./minute and from 800° C. to 1000° C. at an average temperature gradient of 1–3° C./minute while the nitrogen atmosphere in the furnace is maintained at about 100 Torr or less. These compacts were maintained at 1000° C. for one hour to degas, and the temperature was elevated from 1000° C. (the second temperature) to 1350° C. (the first temperature; liquid-phase developing temperature) at the same average temperature gradient. Subsequently, the nitrogen pressure in the furnace was adjusted to 8–12 Torr and the temperature was elevated at a temperature-elevating rate of 6–8° C./minute to the firing temperature (maximum temperature 1500° C.), where these compacts were maintained for one hour. The fired compacts were cooled in an argon atmosphere at about 650 Torr, to thereby obtain sintered cermet compacts.

Comparative Examples or samples were prepared from mixtures of carbide powders containing individual metal components without the use of an M carbonitride powder (Comparative Example: Sample Nos. 5–8). Preparation of samples for the Comparative Example were conducted in accordance with the same process as used for preparation of samples of the Example, including preparation of compacts by press-forming and dewaxing except for the mixture composition. Firing was conducted under the following conditions. Specifically, compacts were heated from room temperature to 1200° C. in a nitrogen atmosphere at $10^{-2}$ Torr, and maintained at 1200° C. for one hour. The temperature was then elevated at a temperature-elevating rate of 2° C./minute to maximum 1500° C., where these compacts were maintained for one hour. They were then cooled in an argon atmosphere at about 650 Torr.

Each of the sinteredcermet compacts was cut at the center portion, and the cross-section was mirror-polished to determine the composition through fluorescent X-ray analysis. The results showed compositions of the sintered samples, for both of the Example and Comparative Example, were almost identical to the mixture compositions and confirmed that there was no difference between the compositions of the samples of Example and those of Comparative Example. The ratios of "total area of the grains in the Ti carbonitride phase having an aspect ratio ($D_{max}/D_{min}$) of 1.5 or more" to "total area of the hard phase" of 50% or more were measured in accordance with a conventional analysis method and

TABLE 2

| TYPE | | POWDER FORMING COMPONENT Ti CARBONITRIDE | POWDER FORMING M CARBONITRIDE | Ni POWDER | Co POWDER |
|---|---|---|---|---|---|
| EXAMPLES | 1 | TiCN: 45<br>TiC: 12 | M CARBONITRIDE A: 35 POWDER | 3 | 5 |
| | 2 | TiC: 36<br>TiN: 24 | M CARBONITRIDE B: 32 POWDER | 3 | 5 |
| | 3 | TiCN: 42<br>TiC: 12 | M CARBONITRIDE A: 34 POWDER | 4 | 8 |
| | 4 | TiC: 35<br>TiN: 23 | M CARBONITRIDE B: 30 POWDER | 4 | 8 |
| COMPARATIVE EXAMPLES | 5 | TiCN: 45<br>TiC: 12 | TaC:9 $Mo_2C$:9 WC:17 | 3 | 5 |
| | 6 | TiC: 36<br>TiN: 24 | NbC:5 $Mo_2C$:9 WC:18 | 3 | 5 |
| | 7 | TiCN: 42<br>TiC: 12 | TaC:8.5 $Mo_2C$:8.5 WC:17 | 4 | 8 |
| | 8 | TiC: 35<br>TiN: 23 | NbC:4 $Mo_2C$:8 WC:18 | 4 | 8 | through the use of photographs of microcrystalline structures obtained by use of a scanning electron microscope.

Figure 3A:
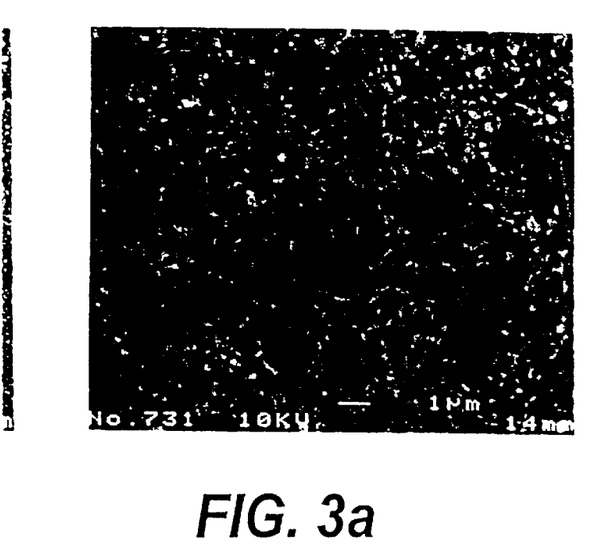
FIG. 3a is a photomicrograph or a scanning electron microscope (SEM) photograph showing the microcrystalline structure of the sintered cermet of the sample No. 1 manufactured in the experiment of the Example.
Figure 3B:
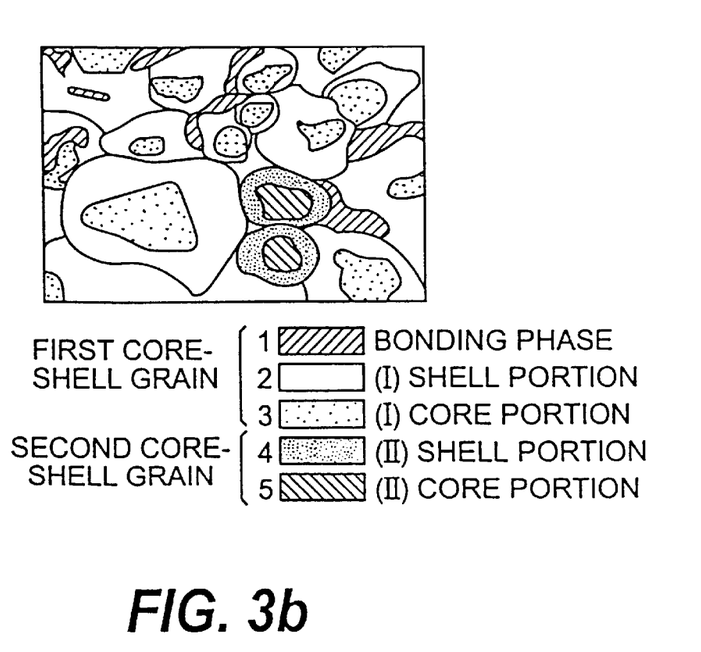
FIG. 3b is an enlarged sketch showing a part of the photograph.
Figure 4:
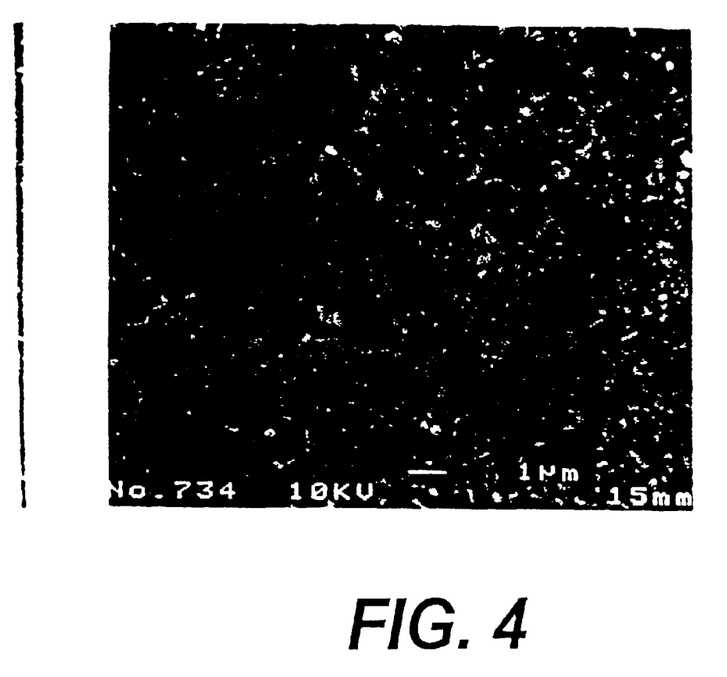
FIG. 4 is a SEM photograph showing the microcrystalline structure of the sample No. 5 manufactured in the experiment of the Example.

FIG. 3(a) is a scanning electron microscopic photograph or micrograph of a microcrystalline structure of Sample 1 of the Example, and FIG. 4 is that of Sample 5 of the Comparative Example (magnification: 5000 times, respectively). A bonding phase (1), a first core-shell grain (a core portion (I) (3)+a shell portion (I) (2)), and a second core-shell grain (a core portion (II) (5)+a shell portion (II) (4)) can be identified from differences in gradation between these phases on the photograph. FIG. 3(b) is a sketch showing an enlarged view of these phases identified in the square area in FIG. 3(a). Table 3 shows an example of the metal component composition of each of the phases, which was obtained through analysis by use of a TEM (transmission electron microscope) and an EDX (energy dispersive X-ray spectroscopy). All these samples have compositions that fall within the range described in the claims.

TABLE 3

(UNIT: WT. %)

| | Ti | Ta | Mo | W | Ni | Co |
|---|---|---|---|---|---|---|
| ① | 4.1 | — | 2.0 | — | 29.0 | 64.7 |
| ② | 47.4 | 7.8 | 31.7 | 13.2 | — | — |
| ③ | 97 OR GREATER | — | — | — | — | — |
| ④ | 25.2 | 17.5 | 27.8 | 29.6 | — | — |
| ⑤ | 3 OR LESS | 17.9 | 20.9 | 58.2 | — | — |

Figure 5A:
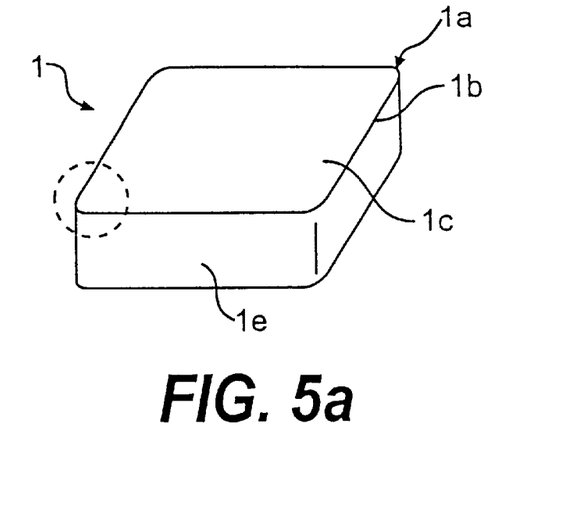
FIG. 5a is a perspective view illustrating a test piece as used for evaluating cutting performance in connection with an example.
Figure 5B:
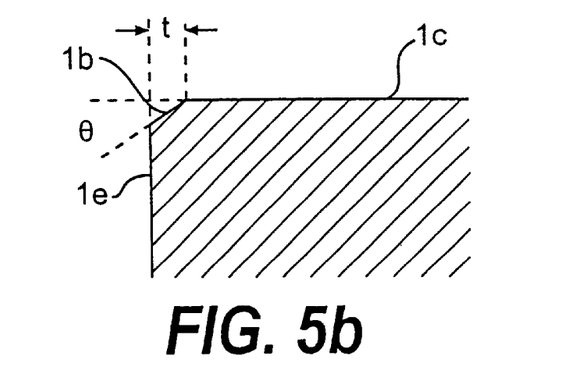
FIG. 5b is a schematic cross-sectional view of a side portion of the test piece shown in FIG. 5a; and, FIG. 5c is an enlarged perspective view of a portion of the test piece shown in FIGS. 5a and 5b.
Figure 5C:
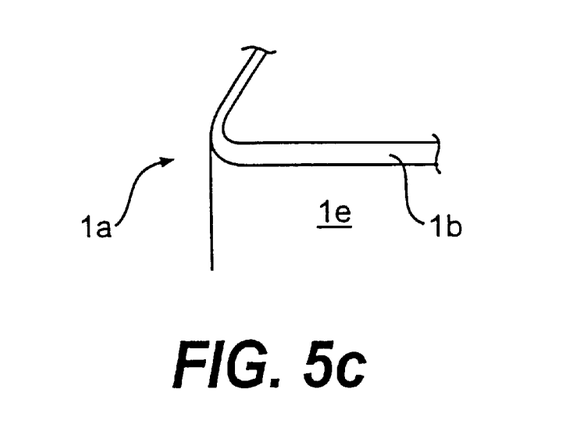

A piece having a shape specified in JIS R 1601 was cut from each of the sintered samples and mirror-polished to serve as a test piece for the following measurement of physical properties. Test pieces for evaluating cutting performance were prepared by mirror-polishing the above sintered samples, which were then formed into a tool shape shown in FIG. 5 (SNGN120308, defined by ISO standard). Specifically, a test piece for evaluating the cutting performance 1 (cermet tool) is a flat prism shape having a thickness of about 3.18 mm and a generally square cross-section, each side of which has a length of about 12.7 mm. Each corner portion 1a of the test piece was rounded to have a radius of about 0.8 mm. Each edge portion 1b was chamfered to have a width t of about 0.1 mm as measured from the main face 1c side and a tilt angle 0 of about 25° with respect to the main face 1c.

At first, fracture toughness (Kc), Vicker's hardness, and transverse strength were measured as physical properties. The fracture toughness (Kc) was measured through an IF method which is defined in JIS R1607 under the conditions of Vicker's indentation load of 30 kgf and indentation time of 30 seconds. The Vicker's hardness was measured also from the indentation area and the load.

Figure 6A:
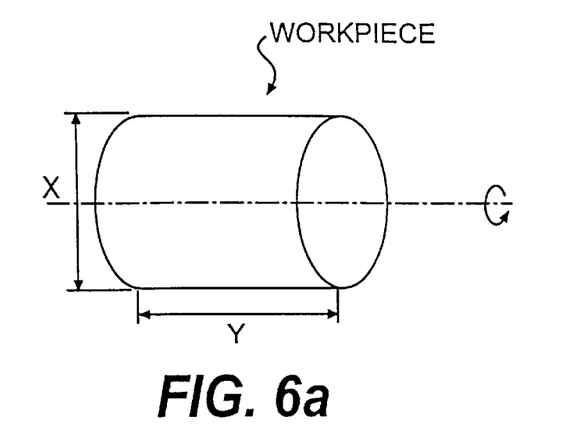
FIG. 6a is a schematic illustration of a cutting tool.
Figure 6B:
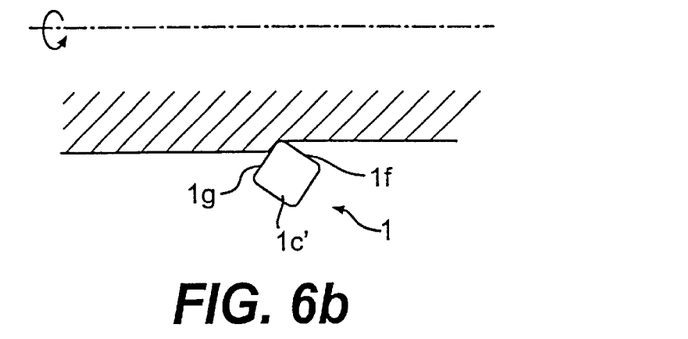
FIG. 6b is a schematic illustration of a cutting tool.

Furthermore, cutting performance of these samples (tools) was evaluated under the following conditions. Specifically, a rod-like workpiece W shown in FIG. 6(b) was rotated about the axis thereof and the test piece 1 shown in FIG. 5 was brought into contact with the outer circumferential surface of the workpiece in a manner as shown in FIG. 6(b). While one of the main faces 1c is used as a face (hereinafter represented by 1c') and a side face 1e is used as a flank, the outer circumferential surface of the workpiece was continuously cut in a wet manner under the following conditions.

Workpiece: Mn steel for machine structure (SNCM439), a rod having three vertical grooves equally spaced in the longitudinal direction (outside diameter: 240 mm. length: 200 mm, groove depth: 50 mm, groove width: 10 mm Cutting speed V: 300 mm/minute Feed rate f: 0.25 mm/rotation Depth of cut d: 1.5 mm Cutting oil: water-miscible cutting oil W1-1-Z (specified in JIS K2241 (1986)); or an oil containing emulsified non-volatile components in an amount of 90% or more and having pH of 8.5–10.5 wherein the non-volatile components comprise fatty acid (0–30 wt. %), mineral oil (50–80 wt. %), and a surfactant (15–35%)

Cutting time: 4 minutes

Figure 7A:
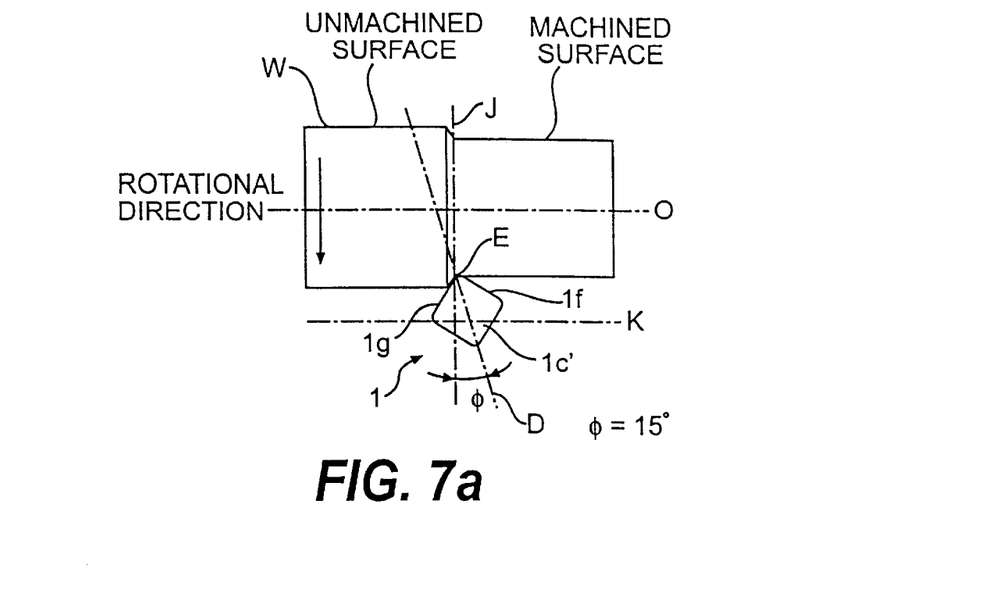
FIG. 7a is a schematic illustration that shows a positional relationship between a test piece and a workpiece.
Figure 7B:
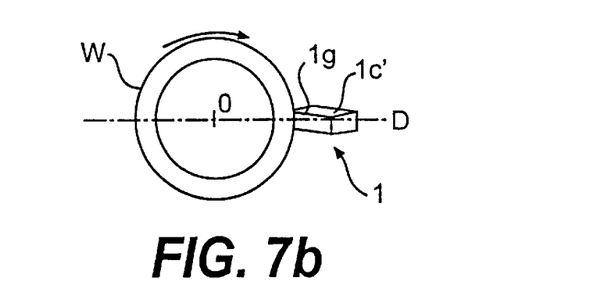
FIG. 7b is a schematic illustration that shows a positional relationship between a test piece and a workpiece; and, FIG. 7c is a schematic illustration that shows a positional relationship between a test piece and a workpiece.
Figure 7C:
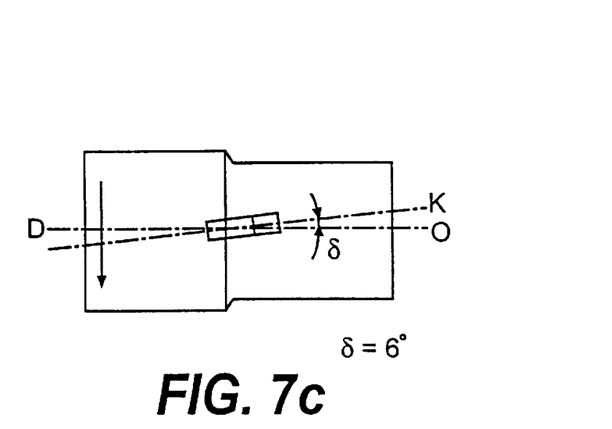

FIG. 7 shows the specific positional relationship between the test piece 1 and the workpiece. In FIG. 7, 1g and 1f respectively represent a side flank and a front flank. Meanings of the other numerals are as follows:

O: center axis of workpiece W

D: line passing through thicknesswise center of test piece and parallel to diagonal line of face 1c' (intersecting O)

E: intersection between D and outer circumferential surface of workpiece W (point of cutting by test piece)

J: line perpendicular to O and intersecting E

K: line passing through thicknesswise center of test piece and parallel to the other diagonal line of face 1c'

φ: intersectional angle between J and D

δ: tilt angle of K to O

Figure 6C:
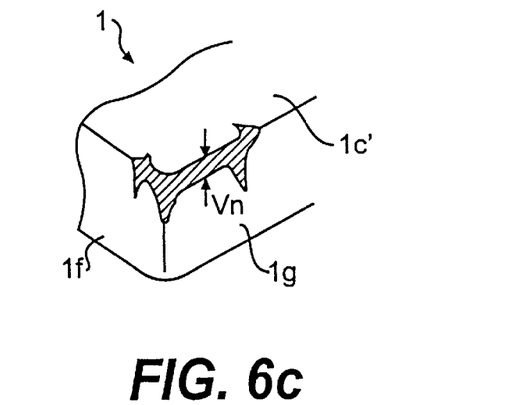
FIG. 6c is a schematic illustration of a cutting tool.

After termination of cutting, flank wear of the tool tip Vn (the height of a worn region of the side flank 1g as measured in the turning direction: see FIG. 6(c)) was measured. These results are shown in Table 4.

TABLE 4

| TYPE | MEASUREMENT RESULTS | CONTENT OF TiCN PHASE HAVING ASPECT RATIO OF 1.5 OR GREATER (VOLUME %) | VICKER'S HARDNESS (kgf/mm²) | FRACTURE TOUGHNESS (MPam½) | FLANK WEAR OF CUTTING EDGE (mm) |
|---|---|---|---|---|---|
| EXAMPLES | 1 | 61 | 1710 | 7.6 | 0.2 |
| | 2 | 62 | 1700 | 7.5 | 0.2 |
| | 3 | 50 | 1600 | 8.8 | 0.26 |
| | 4 | 52 | 1590 | 8.8 | 0.27 |
| COMPARATIVE EXAMPLES | 5 | 43 | 1750 | 6.8 | TIP CHIPPING AFTER 2 MINUTES |
| | 6 | 46 | 1740 | 6.9 | TIP FRACTURE AFTER 3 MINUTES |
| | 7 | 44 | 1600 | 8.3 | TIP CHIPPING AFTER 4 MINUTES |
| | 8 | 41 | 1610 | 8.2 | TIP CHIPPING AFTER 4 MINUTES |

As shown in the results, all sample tools of the Example contain grains of the Ti carbonitride phase having a ratio of "total area of grains having an aspect of 1.5 or more" to "total area of the hard phase" to be 50% or more. The tools maintain sufficient hardness and superior fracture toughness, as compared with the sample tools of the Comparative Example.

Thus, during wet high-speed intermittent cutting of steel that requires high toughness, the tools of the Example exhibit excellent thermal crack characteristics and maintain sufficient wear resistance, so that no fracture or chipping of the tool tips occurs and no abnormal wearing in the tool tips occurs. By contract, in the tools of the Comparative Example, fracture or chipping of the tool tips were generated, and it is believed that the tools in accordance with the Comparative Example will have a relatively short service life.

While the invention has been described in connection with its preferred embodiments, it should be recognized that changes and modifications may be made without departing from the scope of the claims.

What is claimed is:

1. A cermet tool having a structure including a bonding phase and a hard phase, said bonding phase being predominantly formed of Ni or Ni and Co, and said hard phase being formed of a carbonitride phase containing Ti, and at least one other metal selected from the group consisting of V, Cr, Zr, Nb, Mo, Hf, ta, and W and mixtures thereof, wherein the cermet tool comprises Ni or Ni and Co in a total amount of 4–20 wt. %, Ti in an amount of 50–60 wt. %, at least one of V, Cz, Zr, Nb, Mo, Hf, Ta, and W in a total amount of 30–40 wt. %, C in an amount of 5–10 wt. %, and N in an amount of 3–8 wt. %;

and wherein the carbonitride phase contains grains of the Ti carbonitride phase containing a metal component Ti in an amount of 90 wt. % or more with respect to all the metal components of the phase; and wherein a cross-sectional microcrystalline structure of the cermet shows the ratio of "total area of grains of the Ti carbonitride phase having an aspect ratio of 1.5 or more" to "total area of the hard phase" to be 50% or more.

2. A cermet tool according to claim 1, wherein the carbonitride phase is predominantly formed of:

first core-shell grains having a core portion (I) comprising a Ti carbonitride phase containing Ti in an amount of 90 wt. % or more of the metal components in the phase and a shell portion (I) which is formed around the core portion (I) and comprises a first (Ti, M) carbonitride phase containing Ti in an amount of 40–60 wt. % of the metal components in the phase and one or more metals selected from the group consisting of V, Cr, Zr, Nb, Mo, Hf, Ta, and W in an amount of 40–60 wt. % of the metal components in the phase; and second core-shell grains having a core portion (II) comprising an M carbonitride phase whose metal component includes one or more metals selected from the group consisting of V, Cr, Zr, Nb, Mo, Hf, Ta, and W in an amount of 90 wt. % or more and a shell portion (II) which is formed around the core portion (II) and comprises a second (Ti, M) carbonitride phase containing Ti in an amount of 20–30 wt. % of the metal components in the phase and one or more metals selected from the group consisting of V, Cr, Zr, Nb, Mo, Hf, Ta, and W in an amount of 70–80 wt. % of the metal components in the phase, and wherein:

a cross-sectional microcrystalline structure of the cermet shows the ratio of "total area of the core portion (I) having an aspect ratio of 1.5 or more" to "total area of the first core-shell grains and the second core-shell grains" to be 50% or more.

3. A cermet tool having a structure including a bonding phase predominantly formed of Ni or Ni and Co, and a hard phase predominantly formed of a carbonitride phase containing Ti, which serves as an essential metal component, and at least one other metal selected from the group consisting of V, Cr, Zr, Nb, Mo, Hf, Ta and W, wherein the cermet tool contains a formed bonding phase in an amount of 4–20 wt. % and the carbonitride phase is predominantly formed of first core-shell grains having a core portion (I) comprising a Ti carbonitride phase containing Ti in an amount of 90 wt. % or more of the metal components in the phase and a shell portion (I) which is formed around the core portion (I) and comprises a first carbonitride (Ti, M) phase containing Ti in an amount of 40–60 wt. % of the metal components in the phase and one or more metals selected from the group consisting of V, Cr, Zr, Nb, Mo, Hf, Ta, and W in an amount of 40–60 wt. % of the metal components in the phase; and second core-shell grains having a core portion (II) comprising an M carbonitride phase whose metal component includes one or more metals selected from V, Cr, Zr, Nb, Mo, Hf, Ta and W in an amount of 90 wt. % or more and a shell portion (II) which is formed around the core portion (II) and comprises a second carbonitride (Ti, M) phase containing Ti in an amount of 20–30 wt. % of the metal components in the phase and one or more metals selected from the group consisting of V, Cr, Zr, Nb, Mo, Hf, Ta, anc W in an amount of 70–80 wt. % of the metal components in the phase, and wherein a cross-sectional microcrystalline structure of the cermet shows the ratio of "total area of the core portion (I) having an aspect ratio of 1.5 or more" to "total area of the first core-shell grains and the second core-shell grains" to be 50% or more.

4. A cermet tool according to claim 1, wherein the tool is a cutting tool having an edge portion serving as a cutting edge formed between a face and a flank; a chamfer is formed on the edge portion; and an angle between the chamfer and the face thereof is between 20–35°.

5. A cermet tool according to claim 2, wherein the tool is a cutting tool having an edge portion serving as a cutting edge formed between a face and a flank; a chamfer is formed on the edge portion; and an angle between the chamfer and the face thereof is between 20–35°.

6. A cermet tool according to claim 3, wherein the tool is a cutting tool having an edge portion serving as a cutting edge formed between a face and a flank; a chamfer is formed on the edge portion; and an angle between the chamfer and the face thereof is between 20–35°.

* * * * *